March 17, 1959 A. P. MEIER 2,877,925
BULB HANDLING MECHANISM
Original Filed Dec. 17, 1953 5 Sheets-Sheet 1

INVENTOR.
A.P. MEIER
BY
ATTORNEY.

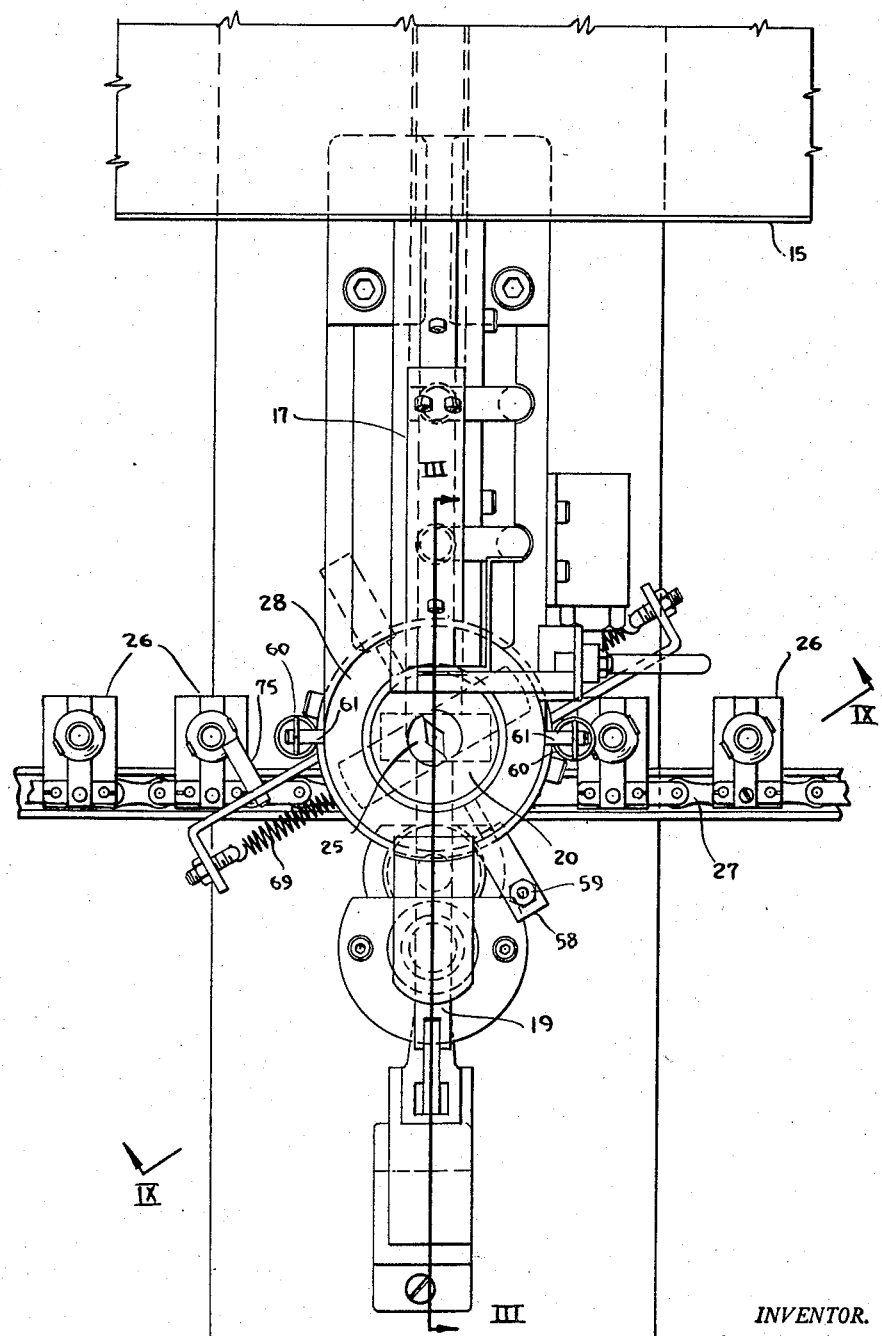

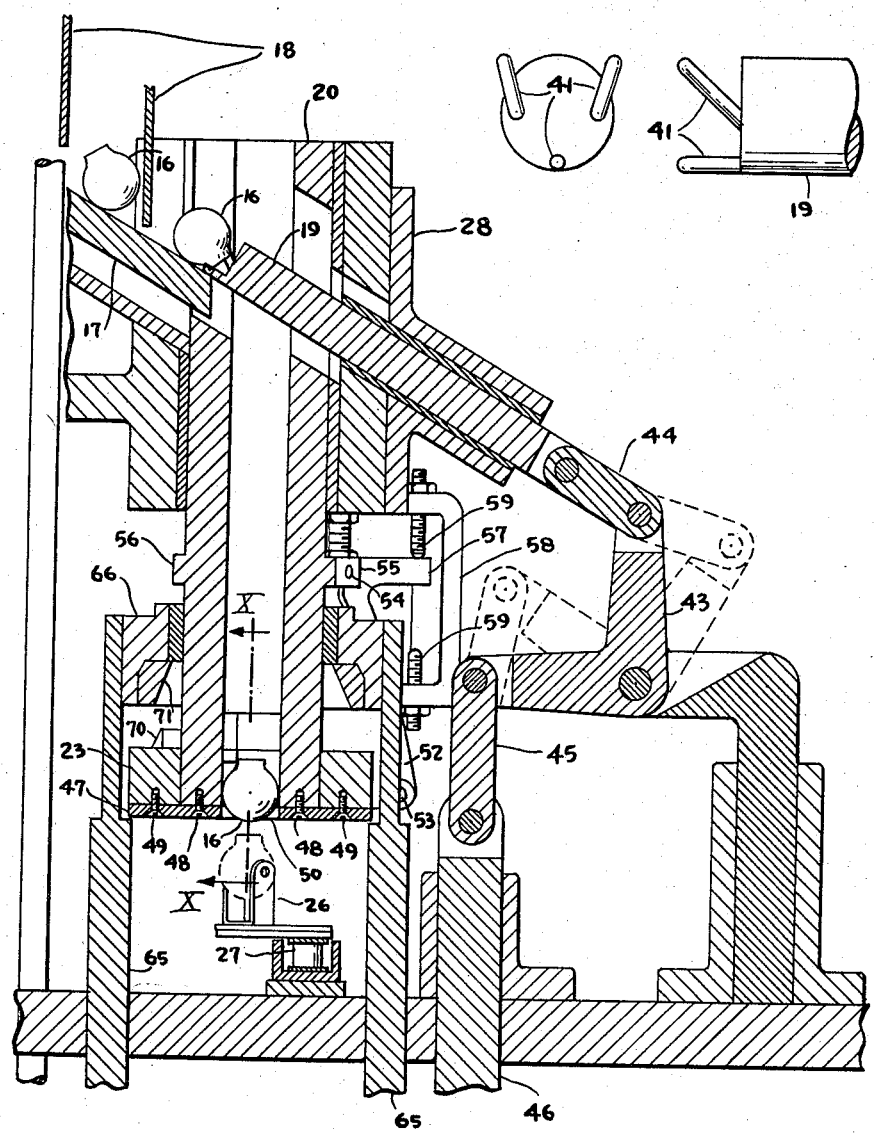

March 17, 1959  A. P. MEIER  2,877,925
BULB HANDLING MECHANISM
Original Filed Dec. 17, 1953  5 Sheets-Sheet 4

INVENTOR.
A. P. MEIER
BY
ATTORNEY.

March 17, 1959 A. P. MEIER 2,877,925
BULB HANDLING MECHANISM
Original Filed Dec. 17, 1953 5 Sheets-Sheet 5
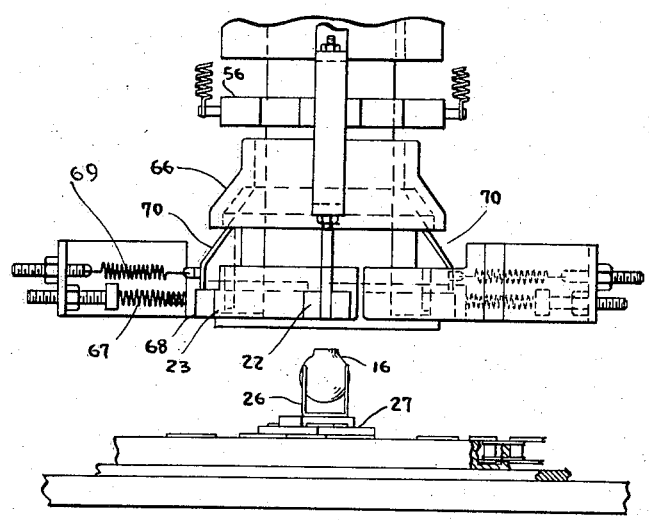
Fig. 9
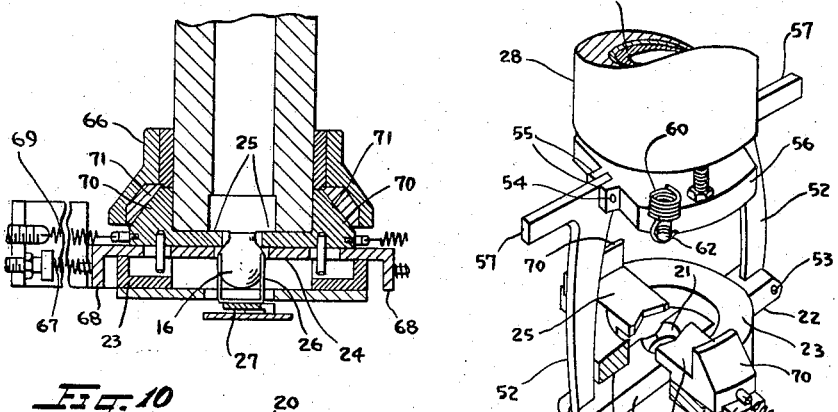
Fig. 11
Fig. 10
Fig. 12
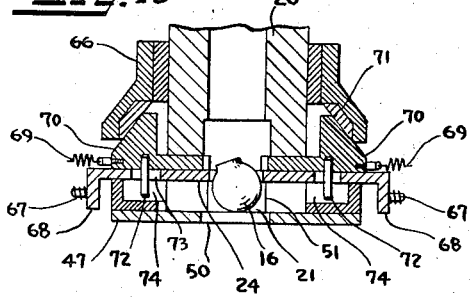
INVENTOR.
A. P. MEIER
BY
Wm. F. Kelly
ATTORNEY.

United States Patent Office 2,877,925
Patented Mar. 17, 1959

2,877,925
BULB HANDLING MECHANISM

Arthur P. Meier, Bloomfield, N. J., assignor to Westinghouse Electric Corporation, East Pittsburgh, Pa., a corporation of Pennsylvania Original application December 17, 1953, Serial No. 398,746, now Patent No. 2,791,314, dated May 7, 1957. Divided and this application February 1, 1955, Serial No. 485,375

6 Claims. (Cl. 221—171)

This is a division of my prior application S. N. 398,746 filed December 17, 1953, and now U. S. Patent No. 2,791,314, issued May 7, 1957. The invention relates to bulb handling mechanism, and particularly to apparatus for orienting and presenting globular electric light bulbs successively to traveling holders in indexed sequence.

Heretofore it has been a general practice for an operator to apply bulbs by hand into the holders of an indexing machine in order that the bulbs might be properly oriented, with the necks thereof extending each time in the proper direction and the bulbs seated firmly in the holder clips of the indexing machine. Hand loading, however, aside from the cost factor for the operator's labor, is a limitation on production and not suitable for present-day high speed manufacture of lamps. The problem therefore has arisen, and has been solved by the present invention, to utilize mechanical means to feed bulbs to the conveyor holders, to properly orient the bulbs and to insert them into the conveyor holders.

The invention has directed more specifically to the mechanisms by which the bulbs are manipulated in transition from the conglomerate arrangement as dumped into a hopper to the ultimate systematic insertion and retention of the bulbs in the conveyor holders.

More specifically the invention proposes novel means for passing bulbs that are properly oriented and for repositioning bulbs not properly oriented so as to orient and pass them also and thereby obtain a succession of bulbs all in proper oriented positions.

These and other objects of the invention will become more apparent to persons skilled in the art to which it appertains as the description proceeds, both by direct explanation thereof and by inference from the context.

Referring to the accompanying drawing in which like numerals of reference indicate similar parts throughout the several views:

Fig. 2 is a plan view of the machine;

Fig. 3 is a sectional view on line III—III of Fig. 2 in the direction of the arrows;

Figs. 4 and 5 are respectively end and side elevations of the bulb-orienting plunger;

Fig. 9 is an elevational view approximately parallel to line IX—IX of Fig. 2 and looking in the direction indicated by the arrows;

Figs. 10 and 11 are sectional views, as on line X—X of Fig. 3 in the direction of the arrows, with the parts in different cyclic positions in process of applying the bulb into a holder of the conveyor; and Fig. 12 is a perspective view of the loading mechanism, but with the flue and camming collar omitted.

Figure 1:
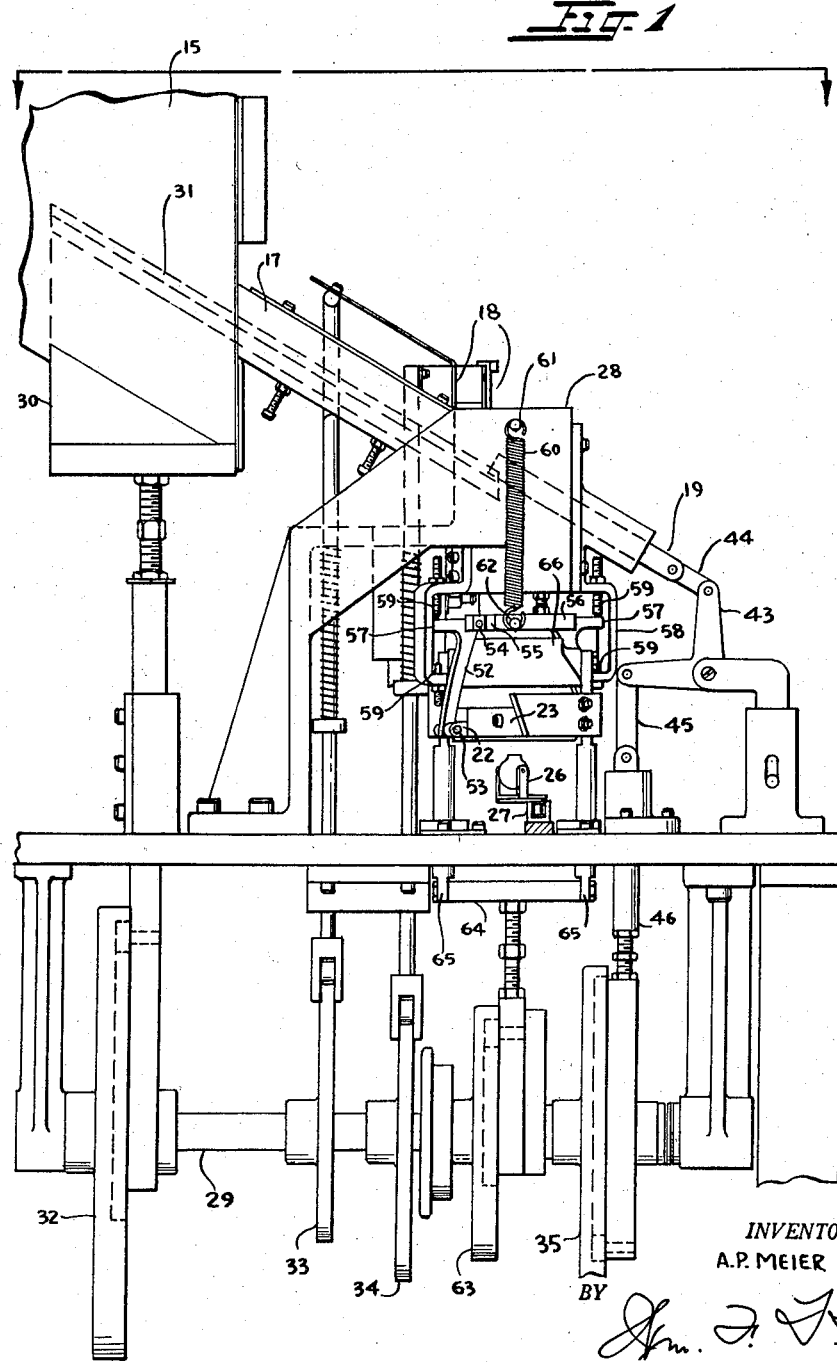
Fig. 1 is a side elevation of the machine of the present invention looking at the same in a direction longitudinally of the receiving conveyor which is shown in cross-section.
Figure 6:
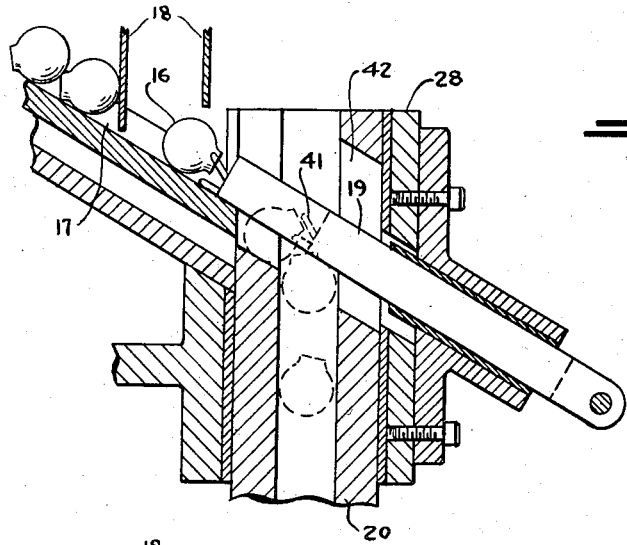
Figs. 6, 7 and 8 are sectional views similar to Fig. 3 and showing the functioning of the bulb-orienting plunger in orientation of bulbs differently approaching the same.
Figure 7:
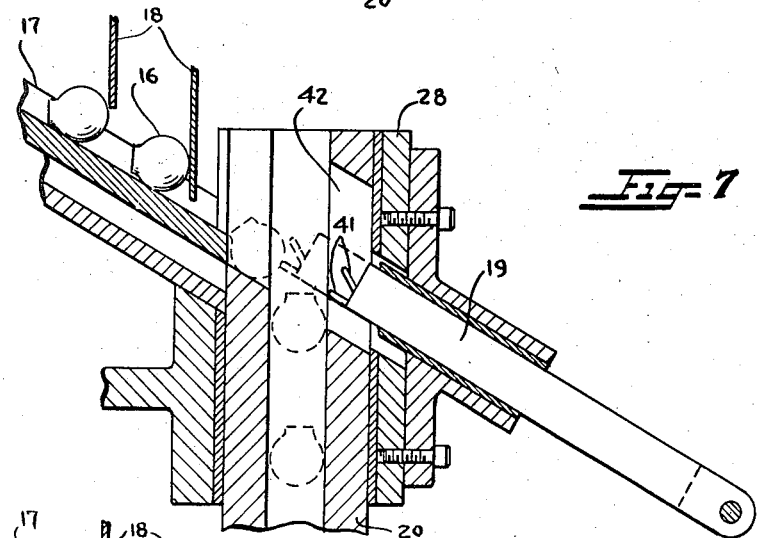
Figure 8:
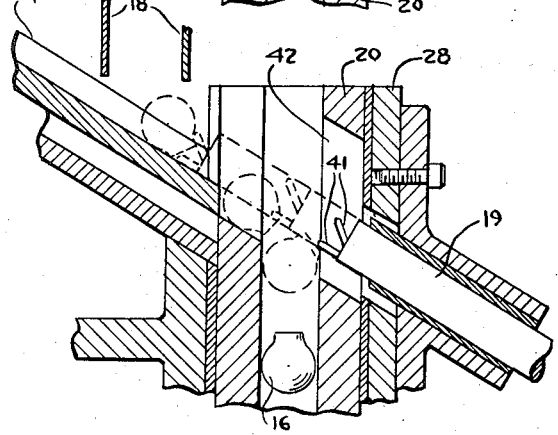

In its general organization, the machine of the present invention provides a hopper 15 into which the bulbs 16 are promiscuously dumped and caused to slide successively down a chute 17 and passed with indexed succession past a pair of controlled wicket gates 18 to an orienting plunger 19 from which they drop, neck up, down a flue 20 to seated position in a split seat 21 (Figs. 10 and 12) provided by jaws 22 slidably carried by a ring housing 23 and with the jaws interposed transversely beneath the flue. Thus located, the bulb 16 is manipulated by a pair of centeralizing jaws 24 and a pair of orienting jaws 25 which adjust the bulb, with neck erect, in axial alignment with a holder 26 on the conveyor 27 indexed to receiving position axially coincident with and beneath the flue and bulb. The housing 23 and appurtenant jaws are then lowered to introduce the bulb into the holder 26 whereupon the jaws are retracted, the housing and jaws are raised, and the conveyor indexed to bring forward another holder.

Referring now in greater detail to the specific embodiment of the invention illustrated in said drawings, said flue 20 (Figs. 2, 3, 6–8, 10 and 11) is essentially a hollow cylinder the interior diameter of which is adequate to pass the bulb therethrough with the bulb neck trailing but with the flue passageway too small to permit the bulb neck to project sidewise while the bulb drops down the flue. Said flue has a limited vertical sliding movement in a fixed vertical hanger 28 (Figs. 1–3, 6–8, and 12). Aforementioned ring housing 23 is fixed on and surrounds the bottom end margin of the flue and moves up and down therewith. The down position is for introduction of the bulb into the conveyor holder and the upward position is to clear the bulb left in the holder for enabling the bulb to pass under the flue as the conveyor indexes.

The bulbs are admitted one at a time to the flue by mechanism timed to function at the same rate as the loading and indexing of the conveyor, this being readily accomplished by operating the various movable parts from a common drive shaft 29 (Fig. 1). Projecting upwardly through the bottom of hopper 15 is a vertically slidable plate 30 the upper edge of which slopes downwardly toward the flue and is channeled to form a movable chute section 31. Said plate is reciprocated by a cam 32 on shaft 29 and in its upward position the channeled upward edge aligns with the chute 17 so as to feed bulbs, that are picked up by the reciprocation of said plate, to said chute 17. The hopper has its bottom wall sloping toward the plate 30, and as the stroke of the plate lowers its upper edge to the bottom of the hopper, bulbs will always roll onto said plate and be lifted to feed onto said chute 17 no matter how few or how many bulbs may be in the hopper at the time.

Next to the lower end of the fixed chute 17 (Figs. 1–3 and 6–8) are a pair of alternately lifting wicket gates 18 operated from shaft 29 by cams 33, 34, respectively, so that when the first one is open to admit a bulb between the gates the second one is closed after which the first one closes and the second one opens to admit just the single bulb to the flue 20.

At the other side of the flue from the chute 17 and aligned therewith is a feed plunger 19 which is reciprocated with proper indexed timing through agency of appropriate links and lever from a cam 35 also on said shaft 29. The forward end of said plunger is movable into the lower end of fixed chute 17 and stops a bulb that has been released by the second wicket gate. The plunger then retracts from obstructing the passageway of the flue and the bulb follows along until the way is sufficiently cleared for it to drop down the flue. The end of the plunger toward the bulb, as viewed in Figs. 1 and 3, is provided with means to orient the bulb so that no matter how the bulb may come down the chute it will always be oriented to drop into the flue with its neck upward.

The bulb orienting means comprises, in combination with the plunger 19, a plurality of fingers 41 (Figs. 6–8) projecting forwardly at its front end. (See Figs. 4 to 8 inclusive.) All of said fingers are located adjacent to the periphery of the plunger, one being at a bottom location and two others at opposite side locations where they project from the plunger end. The finger having the bottom location is axially parallel to the plunger axis whereas the other two slope forwardly upward and outward. Functioning of these fingers to properly orient bulbs approaching differently is clearly illustrated by reference to Figs. 3, 6, 7 and 8. In those instances where the body of the bulb is canted forwardly (Fig. 7), the body engages the bottom finger, and the bulb is thereby kept from rolling forward but instead slides the rest of the way down the chute until it can drop body first down the flue. In the case where the neck of the bulb is sloping downwardly forward, the bottom finger 41 (Fig. 8) or one of the side fingers (Fig. 6) enters the bulb neck and supports it until the bulb body clears the forward end of the chute so the bulb can drop body first down the flue. The flue is appropriately slotted at 42 above the location of the plunger and bulb so as not to interfere with vertical reciprocation of the flue and so the flue will not interfere with reciprocation of the plunger. The indexing is arranged so that when the second wicket gate releases a bulb, the plunger is inward toward the chute and the flue is in its upward location. The specific operating mechanism (Fig. 1) for said plunger includes a bell-crank lever 43 with a link 44 connecting one arm thereof to the plunger and another link 45 connecting the other arm to a vertically slidable cam follower 46 the lower end of which slides upon and is operated by cam 40.

As above indicated, there is a ring housing 23 (Figs. 1, 9, 11 and 12) at the bottom end of flue 20, and as one convenient means for mounting the same, a washer-like retaining plate 47 (Figs. 3 and 10) is shown underlying and coaxial with the flue and appropriately secured thereto as by screws 48. The plate projects circumferentially beyond the flue thereby constituting a ledge upon which the ring housing seats and to which it is held by screws 49. Said plate has a central orifice 50 as large as the flue passageway so as not to obstruct passage of the bulbs 16 therethrough. The under face of the housing is diametrically slotted, at 51 (see Figs. 10 and 12), to receive the jaws 22 slidably therein, and retaining plate 47 underlies the slots, thereby confining the jaws therein.

The inner ends of jaws 22, as viewed in Fig. 12, are hollow ground so that when they are at their inward or abutting position they present an upwardly directed socket of partially spherical configuration into which the bulb may seat. The jaws may, however, be slid outwardly and in that position will clear the flue passageway and then permit withdrawal of the bulb downwardly between the jaws.

In order to slide said jaws, the same are shown (Figs. 4 and 12) projecting at their outer ends a distance exterior to the ring housing and each is forked to receive the lower end of an arm 52 (Figs. 1, 2 and 12) pivoted thereto by a pivot pin 53. Said arm extends upward and is again pivoted at 54 to bosses 55 fixed with respect to the flue, for instance, as integral parts of a radially extending flange 56 on the flue somewhat below hanger 28. Said arm 52 has an outwardly directed branch 57 at its upper end opposite the pivoting 54 so that depression of the branch swings the arm inwardly and lifting the branch swings the arm outwardly with corresponding inward and outward movement thereby conveyed to the split-seat jaws 22.

Intermittent or lost-motion swinging of said arms 52 is provided in order that the jaws shall remain closed during part of the cycle and remain retracted or open during part of the cycle. To accomplish this desideratum, the arm branches 57 are swung downward as the flue attains its uppermost position and remain at that angle of swing until the flue substantially attains its lowermost position at which time said branches are swung upward. Having been swung to an upward angle of swing the arms retain that status until the flue moves again to its uppermost position when the cycle repeats. The mechanism here shown to thus actuate the arms comprises brackets 58 fixed on and depending from hanger 28 directly opposite said arms with a part of each bracket above and a part below its respective arm branch at distances therefrom adequate to provide the lost-motion operation above described. Adjustable stops, shown as screw studs 59, extending vertically through said bracket parts above and below the arm branch, enable the swing of the arms to be effected during the final movement of the flue each way.

The flue is actuated at its uppermost position by tension springs 60 (Figs. 1 and 2) hooked at their upper ends on studs 61 projecting from the sides of the hanger 28 and hooked at their lower ends on similar studs 62 projecting from flange 56. The flue is actuated downward by a cam 63 on drive shaft 29 which reciprocates a cross yoke 64 to the ends of which are attached upwardly extending slide bars 65 at diametrically opposite sides of the flue. The upper ends of these bars 65 are secured to a collar 66 sidably mounted on said flue above the ring housing 23 and below the flange 56. In the course of downward movement of said collar 66, it comes in contact with the top of ring housing 23 and slides said housing from the position of Figs. 3 and 9 to the lowermost position of Fig. 11. It is while the flue and ring housing come to this lowermost position that the bulb is transferred to the holder 26 of the conveyor.

Before the bulb is transferred to the holder, it is centered and oriented to locate the neck in a vertical position. Centering is accomplished by centralizing jaws 24 (Figs. 10–12) which move inwardly toward the bulb on a diameter at right angles to the direction of movement of the split-seat jaws 22. Said centralizing jaws are constituted by elongated slidable plates the inner ends of which each provide a V-shaped fork that will engage at separated points on the spherical surface of the bulb so that with the four point contact effected by the two opposed jaws, the bulb will be invariably centralized thereby. These jaws slide in the bottoms of radial grooves formed in the top of ring housing 23 and are actuated inwardly by compression springs 67 located opposite and in compressive engagement with turned down lips 68 at the outer ends of the jaws 24.

Superposed slidably upon said centralizing jaws 24 (Figs. 10–12) and in the same grooves therewith are orienting jaws 25. These orienting jaws likewise preferably have V-shaped inner ends and are arranged to contact the bulb neck to straighten it up so it will axially align with the flue and be vertical when the bulb is transferred to the holder. These orienting jaws accordingly move inward over a part of the bulbous portion of the bulb next to the neck, that part generally being referred to in the trade as the bulb shoulder. The outer ends of orienting jaws 25 have tension springs 69 attached thereto tending to withdraw the jaws from the bulb-engaging position. At the top of the outwardly projecting ends of said orienting jaws 25 are upstanding cam dogs 70 (Figs. 10–12) which slope downwardly outward and are adapted to be engaged by correspondingly sloping cam surfaces 71 provided at the under side of collar 66. When the collar 66 is lowered to where the cam surfaces 71 engage dogs 70, the wedging cam action therebetween forces the orienting jaws 25 inward.

The centralizing jaws 24 underlying orienting jaws 25 are controlled, in part, therefrom. As shown in Fig. 10, the overlying orienting jaws 25 have pins 72 depending therefrom through slots 73 in the underlying centralizing jaws 24 and projecting at their lower ends into slots 74 in ring housing 23. Said slots are all radial with respect to the housing and the pins are simultaneously movable in both. The outer ends of the slots 73 in the centralizing jaws are at such position with respect to the pins that the inner ends of said jaws may, in their inward movement, engage the bulb in advance of the overlying orienting jaws. The slots in the centralizing jaws 24 then permit those jaws to remain at rest, under influence of their spring loading, against the bulb while the orienting jaws continue inward movement under influence of the cam surface and dog propulsion. When the collar 66 ultimately moves upward, tension springs 69 retract the orienting jaws 25 and shortly pins 72 engage the ends of the slots 73 so that said tension springs 69, which are considerably stronger than compression springs 67, not only continue to retract the orienting jaws but also retract the centralizing jaws.

Inasmuch as the orienting jaws 24 overlie the shoulder of the bulb, downward movement of the housing 23 and jaws, as viewed in Figs. 9, 11 and 12, may be utilized to press the bulb into the holder. Accordingly, the amplitude of downward movement for said housing is made sufficient to not only press the cam surface 71 to slide the jaws 24, 25 inward as above described but continues further in downward stroke to move the ring housing and flue downward against the tension of springs 60 so the housing surrounds the holder and the bulb is pressed thereinto. The timing of the movements of the several parts of the mechanism is such that after the orienting jaws 25 engage the neck, the arms 52 start to swing and retract the jaws 22 of the split seat, thereby admitting the holder 26 to access to the sides of the bulb. The retention of the bulb by the jaws 25 engaging the cylindrical neck is comparatively a weak grip whereas the retention of the bulbous portion of the bulb by the holder 26 is much stronger, so that as the housing and its jaws rise, the bulb is left in the grip of the holder and in desired oriented position with the bulb neck vertically upward. Because of the presence of upper stud 61 overlying the branch 57 of arm 52, the housing 23, actuated upward by springs 60 is stopped before collar 66, which is cam operated, reaches the upper end of its stroke. This results in a separation of the collar cam surface 71 from cam dog 70 and retraction of the centralizing and orienting jaws 24 and 25 which therefore are open and ready to repeat the cycle. The conveyor indexes to bring the next holder under the flue and the cycle then repeats.

A lateral cam 75 (Fig. 2) projects from the ring housing 23 at the side thereof toward the next approaching holder 26, in appropriate location to engage a bulb which may have been left in the holder. This engagement occurs as the ring housing lowers to press a bulb in the holder under the flue, and thus assures that the next holder shall be cleared of any bulb therein and be ready to index under the flue to receive a bulb therefrom in the next cycle of operation.

I claim:

1. Apparatus for loading on a conveyor hollow bulbs having a body portion and an open neck portion, comprising a hopper for receiving bulbs promiscuously disposed therein, a chute for releasing said bulbs from the hopper in sequence, a flue for receiving said bulbs from said chute, and reciprocable means at the junction of said chute and flue having a plurality of fingers extending toward said chute for engaging and orienting said bulbs, neck up, and for releasing the bulbs one at a time to drop down said flue.

2. Apparatus for loading on a conveyor hollow bulbs having a body portion and an open neck portion, comprising a chute for feeding bulbs sequentially, means for supplying bulbs to said chute, means for releasing the bulbs one at a time to pass to the lower end of said chute, a plunger reciprocable to the lower end of said chute along the path of the released bulb, said plunger having a plurality of bulb-engaging and orienting fingers extending toward said chute to engage such bulb whereby as the plunger retracts the bulb is required to fall from the chute neck upward.

3. Apparatus for loading on a conveyor hollow bulbs having a body portion and an open neck portion, comprising a chute for feeding sequentially, means for supplying bulbs to said chute, means for releasing the bulbs one at a time to pass to the lower end of said chute, a plunger reciprocable to the lower end of said chute along the path of the released bulb, said plunger having a plurality of bulb-engaging and orienting fingers extending toward said chute to engage such bulb whereby as the plunger retracts the bulb is required to fall from the chute with the neck of said bulb upward, and a hollow flue at the lower end of said chute for receiving said bulbs oriented therein with necks upward.

4. Apparatus for loading on a conveyor hollow bulbs having a body portion and an open neck portion, comprising a hopper for receiving bulbs promiscuously disposed therein, a chute for releasing said bulbs from the hopper in sequence, a flue for receiving said bulbs from said chute, and reciprocable means at the junction of said chute and flue having a plurality of fingers extending toward said chute for engaging and orienting said bulbs, neck up, and for releasing the bulbs one at a time to drop down said flue, one of said fingers being operable to enter the open neck portion of a bulb having its open neck portion sloping forwardly and to support such bulb so that the latter can drop body first down the flue.

5. Apparatus for loading on a conveyor hollow bulbs having a body portion and an open neck portion, comprising a hopper for receiving bulbs promiscuously disposed therein, a chute for releasing said bulbs from the hopper in sequence, a flue for receiving said bulbs from said chute, and reciprocable means at the junction of said chute and flue having a plurality of fingers extending toward said chute and operable to engage the body portion of a bulb having its body portion canted forwardly, to prevent such bulb from rolling further forwardly, and to permit such bulb to slide down such chute with its body portion canted forwardly until it drops body first down the flue.

6. Apparatus for loading on a conveyor hollow bulbs having a body portion and an open neck portion, comprising a hopper for receiving bulbs promiscuously disposed therein, a chute for releasing said bulbs from the hopper in sequence, a flue for receiving said bulbs from said chute, and reciprocable means at the junction of said chute and flue having a plurality of fingers extending toward said chute and operable to engage the body portion of a bulb having its body portion canted forwardly, to prevent such bulb from rolling further forwardly, and to permit such bulb to slide down such chute with its body portion canted forwardly until it drops body first down the flue, one of said fingers being operable to enter the open neck portion of a bulb having its open neck portion sloping forwardly and to support such bulb so that the latter can drop body first down the flue.

References Cited in the file of this patent

UNITED STATES PATENTS

| | | |
|---|---|---|
| 635,588 | Pondorf | Oct. 24, 1899 |
| 1,623,066 | Nordstrom | Apr. 5, 1927 |
| 2,137,173 | Malloy | Nov. 15, 1938 |
| 2,341,014 | Blair | Feb. 8, 1944 |
| 2,658,199 | Ayers | Nov. 10, 1953 |

FOREIGN PATENTS

| | | |
|---|---|---|
| 465,713 | Canada | June 6, 1950 |
| 812,888 | France | Feb. 15, 1937 |